Patented July 24, 1951

2,561,493

UNITED STATES PATENT OFFICE 2,561,493

PLASTICIZED AND STABILIZED CELLULOSE ACETATE

Amerigo F. Caprio, Madison, and Royal L. Shuman, Newark, N. J., assignors to Celanese Corporation of America, a corporation of Delaware No Drawing. Original application September 13, 1945, Serial No. 616,144. Divided and this application January 17, 1947, Serial No. 722,765

1 Claim. (Cl. 106—177)

This invention relates to certain novel compositions of matter containing novel non-toxic plasticizers. This application is a division of our abandoned application Ser. No. 616,144, filed September 13, 1945, which is directed to the preparation of our novel phosphoric acid esters.

An object of this invention is the production of novel compositions containing as plasticizer novel non-toxic compounds comprising organic halogenated aryl esters of phosphoric acid.

Other objects of this invention will appear from the following detailed description.

Organic phosphoric acid esters, such as triphenyl phosphate, tricresyl phosphate, etc., are well-known as plasticizers for cellulose nitrate, cellulose acetate or other organic derivatives of cellulose and as lubricants, solvents, fire-retardants, lubricant additives, modifiers for various types of coating compositions and as absorption media in air-conditioning systems. A disadvantage inherent in the organic phosphoric esters hitherto employed is their toxic character and the fact that continued exposure or contact therewith produces an undesirable reaction on the animal system.

We have now found that certain novel halogenated aryl esters of phosphoric acid having at least one halogen in the meta- and para-position and of the following general formula:

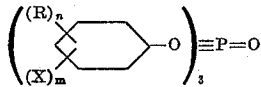

wherein R is an alkyl group such as methyl, ethyl, propyl, butyl, isobutyl, tertiary butyl, amyl, etc., X is a halogen, $n$ is 0, 1 or 2 and $m$ is an integer of at least 1, are not only excellent plasticizing agents but, in addition, do not exert the toxic effects exhibited by the corresponding non-halogenated compounds. This finding is quite surprising in view of the fact that halogenation of the benzene ring normally would be assumed to increase the toxicity of compounds so substituted.

The novel compounds of our invention may be prepared by reacting from one mol of a phosphorus oxy-halide such as, for example, phosphorus oxychloride, with three mols of the desired halogenated phenol or homolog of phenol at an elevated temperature. Preferably, the reaction is effected in the presence of a catalyst, such as anhydrous magnesium chloride, the reaction being continued for from 5 to 12 hours, or until the evolution of the gaseous hydrogen halide formed during the reaction ceases. When using a catalyst, the maximum temperature necessary to effect the desired reaction usually will not exceed 225° C. Higher temperatures are, however, usually necessary where a catalyst is not employed. The crude esters formed which are either solids or liquids may then be purified, preferably by fractional distillation under reduced pressure as in the case of triphenyl phosphate and tricresyl phosphate. The novel esters produced are highly stable and do not undergo any decomposition during the distillation operations.

Further purification of our novel esters may be effected in the case of those distilled esters which are crystalline solids by dissolving the ester in a volatile, inert hydrocarbon such as hexane, or in a mixture of ethyl alcohol and acetone, at a temperature of 35 to 75° C. and then cooling the solution to a point where the halogenated aryl phosphoric acid ester recrystallizes. The supernatant liquid is filtered off or decanted. Further purification of the halogenated aryl phosphoric acid esters, particularly those which are liquids at room temperature may be effected by washing said esters with a hot 1 to 3% aqueous solution of sodium hydroxide, followed by hot water washes to remove all traces of alkali. The halogenated aryl phosphoric acid esters may then be treated at an elevated temperature of 95 to 100° C. with a 0.5 to 1% aqueous solution of potassium permanganate for 10 minutes to one hour. The purified ester separates from the water layer on standing. The treated ester may be drawn off from the water layer and all traces of water and suspended matter in the ester eliminated by centrifuging, drying, etc.

As examples of the halogenated phenols which may be reacted with the phosphorous oxyhalide to yield the novel esters of our invention, there may be mentioned para-chlorophenol, para-chloro-meta-cresol, as well as chloro xylenols, dichloro phenols, dichloro cresols or dichloro xylenols containing at least one chlorine in the meta- and/or para-position or both. Mixtures of these meta- and para-halogenated phenolic bodies may also be employed when it is desired to prepare a complex ester. While our novel compounds may contain a halogen in the ortho-position, as in the case of 2,4-di-chlorophenol, at least one of the meta- or para-positions should also be substituted by a halogen.

The novel halogenated aryl phosphoric acid esters of our invention are light colored, odorless, practically neutral liquids or solids, stable against hydrolysis by water, and non-flammable and non-corrosive. These meta- and para-halogenated aryl esters of phosphoric acid are useful as plasticizers and fire retardants in plastic compositions, and in the preparation of coating materials having as their base cellulose esters, cellulose ethers and/or synthetic resins. They may also be employed as softeners and modifiers for chlorinated rubber, for the various types of synthetic rubber and for compounds such as polyvinyl chloride, copolymers of vinyl chloride and vinyl acetate, etc. Examples of cellulose esters with which said halogenated aryl esters of phosphoric acid may be compounded are cellulose nitrate, cellulose acetate, cellulose propionate, cellulose butyrate, cellulose acetate-propionate and cellulose acetate-butyrate, while examples of cellulose ethers are ethyl cellulose and benzyl cellulose. If desired, suitable stabilizers such as calcium lactate may also be added in compounding cellulosic derivatives.

In order further to illustrate our invention, the following examples are given:

*Example I*

A mixture of 480 parts by weight (3.0 mols) of 2,4-di-chlorophenol,

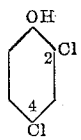

154 parts by weight (1 mol) of phosphorus oxychloride and 2.5 parts by weight of anhydrous magnesium chloride is heated gradually at a rate to evolve hydrogen chloride gas gradually over a period of ten hours. The reaction mixture is heated to a final temperature of 225° C. At this point, the reaction is substantially complete and no more hydrogen chloride is given off. After cooling, the crude product comprising tri-(2,4-dichlorophenyl)-phosphate is fractionally distilled under a pressure of 15 mm. of mercury, at a temperature of 300 to 320° C. The distillate forms a clear yellow-green crystalline product on cooling. The crude tri-(2,4-dichlorophenyl)-phosphate crystals are then added to an equal volume of hexane and boiled. After boiling and while agitating the mixture, the vessel is immersed in cold water. On cooling, the tri-(2,4-dichlorophenyl)-phosphate separates out as a white crystalline solid. The crystals are filtered substantially dry by suction and recrystallized again from hexane. The purified crystals are filtered and dried in a current of warm air. The purified tri-(2,4-dichlorophenyl)-phosphate is a pure white crystalline solid having a melting point of about 94° C. This novel phosphoric acid ester has a high degree of compatibility with cellulose esters and ethers, for example, and exhibits a substantially lower toxic effect, when tested for both its acute toxicity and chronic toxicity action, than the corresponding non-halogenated ester.

*Example II*

Para-chloro-phenol

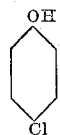

is reacted with phosphorus oxychloride in the presence of anhydrous magnesium chloride in the manner described in Example I. The crystalline solid which is obtained on completion of the reaction may be purified as above described by recrystallization from hexane or a mixture of alcohol and acetone. This novel ester comprises tri-(para-chloro-phenyl)-phosphate and has a melting point of about 80° C., and is relatively non-toxic.

*Example III*

Para-chloro-meta-cresol

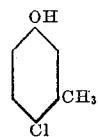

is reacted with phosphorus oxychloride in the presence of anhydrous magnesium chloride in the manner described in Example I. A crystalline product comprising tri-(para-chloro-meta-cresyl)-phosphate is obtained having a melting point of about 110° C., and is relatively non-toxic.

*Example IV*

Para-chloro-2,3-xylenol of the following formula:

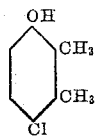

is reacted with phosphorus oxychloride in the presence of anhydrous magnesium chloride in the manner described in Example I. The product obtained, tri-(para-chloro-2,3-dimethyl-phenyl)-phosphate is a liquid at room temperature. The liquid product is fractionally distilled, washed with a 2.5% aqueous solution of sodium hydroxide and then washed neutral with hot water. The liquid ester is then treated for one-half hour with a 0.5% aqueous potassium permanganate solution at 95° C., separated from the aqueous layer and the water present removed by centrifuging and drying.

It is to be understood that the foregoing detailed description is merely given by way of illustration and that many variations may be made therein without departing from the spirit of our invention.

Having described our invention, what we desire to secure by Letters Patent is:

A substantially non-toxic composition of matter comprising cellulose acetate plasticized with tri-(2,4-dichlorophenyl)-phosphate and containing a stabilizer consisting of calcium lactate.

AMERIGO F. CAPRIO.
ROYAL L. SHUMAN.

REFERENCES CITED

The following references are of record in the file of this patent:

UNITED STATES PATENTS

| Number | Name | Date |
|---|---|---|
| 1,607,474 | Mork | Nov. 16, 1926 |
| 1,685,444 | Zelger | Sept. 25, 1928 |
| 1,884,433 | Webb | Oct. 25, 1932 |
| 2,117,283 | Bass | May 17, 1938 |
| 2,170,833 | Moyle | Aug. 29, 1939 |
| 2,202,041 | Altmegg et al. | May 28, 1940 |
| 2,280,863 | Stern | Apr. 28, 1942 |
| 2,307,083 | Thrune | Jan. 5, 1943 |
| 2,395,083 | Richter et al. | Jan. 5, 1943 |

OTHER REFERENCES

Beilstein: "Handbuch Org. Chem.," 4th ed. (1923), page 189, vol. VI.

Bures: "Chemical Abstracts," vol. 22, page 63 (1928).